United States Patent
Jüttner et al.

(10) Patent No.: US 8,218,453 B2
(45) Date of Patent: Jul. 10, 2012

(54) NETWORK ROUTER AND METHOD OF CONFIGURING A NETWORK ROUTER

(75) Inventors: Alpár Jüttner, Érd (HU); András Császár, Budapest (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

(21) Appl. No.: 12/525,717

(22) PCT Filed: Feb. 8, 2007

(86) PCT No.: PCT/EP2007/051220
§ 371 (c)(1),
(2), (4) Date: Feb. 24, 2010

(87) PCT Pub. No.: WO2008/095539
PCT Pub. Date: Aug. 14, 2008

(65) Prior Publication Data
US 2010/0150024 A1    Jun. 17, 2010

(51) Int. Cl.
*H04L 12/28* (2006.01)
*H04L 12/56* (2006.01)
*G06F 15/173* (2006.01)

(52) U.S. Cl. ......... 370/254; 370/389; 370/401; 709/238

(58) Field of Classification Search .......... 370/254–357, 370/389–401; 709/217–238, 242–245
See application file for complete search history.

(56) References Cited

U.S. PATENT DOCUMENTS

| | | | |
|---|---|---|---|
| 5,649,108 A * | 7/1997 | Spiegel et al. | 709/241 |
| 5,951,649 A | 9/1999 | Dobbins et al. | |
| 6,161,144 A * | 12/2000 | Michels et al. | 709/238 |
| 6,553,000 B1 * | 4/2003 | Ganesh et al. | 370/235 |
| 6,678,269 B1 * | 1/2004 | Michels et al. | 370/389 |
| 6,956,854 B2 * | 10/2005 | Ganesh et al. | 370/392 |
| 7,023,846 B1 * | 4/2006 | Andersson et al. | 370/389 |
| 7,065,082 B2 * | 6/2006 | Ganesh et al. | 370/392 |
| 7,325,071 B2 * | 1/2008 | Krishnan | 709/238 |
| 7,330,467 B2 * | 2/2008 | Sharma | 370/360 |
| 7,411,916 B2 * | 8/2008 | Sakov et al. | 370/252 |
| 7,483,999 B2 * | 1/2009 | Weyman | 709/238 |
| 7,706,302 B2 * | 4/2010 | Page | 370/254 |
| 8,040,888 B1 * | 10/2011 | MacAdam et al. | 370/392 |
| 2005/0149600 A1 | 7/2005 | Herring et al. | |

FOREIGN PATENT DOCUMENTS

EP    0 909 062 A    4/1999
EP    0 993 156 A2   4/2000

* cited by examiner

*Primary Examiner* — M. Phan

(57) ABSTRACT

Disclosed is a method of configuring routing information in a network router linked into a network. The network router has a forwarding table. The method comprises removing the forwarding table entries which are not used. A network router configured in accordance with the method has a forwarding table comprising only forwarding table entries that are used.

23 Claims, 3 Drawing Sheets

NETWORK ROUTER AND METHOD OF CONFIGURING A NETWORK ROUTER

TECHNICAL FIELD

The present invention relates to a network router and a method of configuring network routing information in a network router.

BACKGROUND

Existing Internet Protocol (IP) routers operate based on a hop-by-hop forwarding principle. The base function of this is realised in a table containing destinations or destination prefixes and corresponding next hops, i.e. outgoing interfaces. This way, each node receiving a packet data unit (PDU) is capable of searching the next-hop to which it should forward the packet. In the forwarding engine hardware, this table is often referred to as a forwarding table.

The internet is currently organised in a hierarchical manner, meaning that an intra-domain routing protocol or Interior Gateway Protocol (IGP)—typically Open Shortest Path First (OSPF), or Intermediate System to Intermediate System IS-IS—calculates the shortest paths inside a local domain, and a separate protocol takes care of inter-domain routing. This Exterior Gateway Protocol (EGP) in IP networks is typically implemented as Border Gateway Protocol (BGP). In practice, BGP identifies and returns the edge-router (i.e. the inter-domain next-hop) that should be used to reach the destination prefix. Subsequently recursive lookup is used in the router in order to find the local next-hop (i.e. the outgoing interface) leading towards this particular edge router.

IP router implementations often contain a separate forwarding table for each incoming interface, although in practice the tables are often filled with the same values. However, some recent proposals already utilise the possibility that these tables may be filled with different values (Zifei Zhong, et al.: "Failure Inferencing based Fast Rerouting for Handling Transient Link and Node Failure", Infocom 2005.)

If a link or node goes down in the network, the appropriate routing protocols propagate this information and the router calculates a new route to the destinations. During this so-called routing re-convergence, i.e. as long as not all routers have installed the new routes (i.e. new next-hops), the network may experience transient routing loops and lost packets.

Normally, forwarding tables are recalculated in each router by a control element (the routing engine). However, in some other concepts, like in the distributed router system described in "Performance Evaluation of Control Plane Modularization and Decentralisation for BGP", Markus Hidell et al., Usenix 2006, the forwarding tables are calculated on distributed control elements and are downloaded to the physically separate forwarding elements over the regular IP network.

Some solutions for IP-based fast re-route (IP-FRR) are based on putting alternative "virtual" IP addresses per node (also known as "not-via addresses") into each router's forwarding table. These virtual addresses are then allocated a different next-hop than the normal IP address of the destination. This way, in case of a failure, a detour path can be used leading to the same destination.

Existing forwarding tables are nowadays very long. It has been observed by M. Hidell et al. (supra) that the number of entries can be higher than 100,000. Currently the forwarding table of a router is set up in such a way that it contains an entry for each destination or each destination prefix the router is aware of.

Using not-via addresses further increases the entries in forwarding tables. Aiming at the repair of single node or link failures, the increase is a number of additional entries equal to the number of links in the network. With double failure protection the increase is a square function of links.

The growth of forwarding tables slows down the forwarding, because the lookup from a large database takes longer than from a small one.

Calculating the routes for external prefixes takes more time than required due to the lookup of irrelevant prefixes in recursive lookup.

A major part of re-convergence time of link state routing protocols is spent with the download of the next-hops into the forwarding engines of line cards.

In the distributed router concept, a high number of destination prefixes also increases the signalling bandwidth overhead required to download the forwarding tables to the forwarding elements.

SUMMARY

It is an object of the present invention to obviate at least some of the above disadvantages and provide an improved network router and an improved method of configuring a network router.

According to a first aspect of the present invention there is provided a method of configuring a network router. The network router comprises a plurality of ingress interfaces, and an interface forwarding table assigned to each ingress interface. The method comprises the step of determining if the ingress interface may be used as part of a route from any source node to any destination node in the network. The forwarding table entries that are not used are removed from at least one of the interface forwarding tables.

According to a second aspect of the present invention there is provided a method of configuring a network router. The network router comprises a node forwarding table for the node itself. The method comprises the step of determining if the node may be used as part of a route from any source node to any destination node in the network. The forwarding table entries that are not used are removed from the node forwarding table.

In a first configuration of the second aspect the network router may further comprise a plurality of ingress interfaces, and an interface forwarding table assigned to each ingress interface. The method may further comprise removing the forwarding table entries that are not used from at least one of the interface forwarding tables.

In a configuration of the first or second aspect, the routing tables of all nodes and interfaces in the network may be known. The step of removing the forwarding table entries which are not used may comprise for all destination entries in the forwarding table, checking for all source nodes in the network whether the route from the source node to the destination node comprises a link directed towards the network router. The entry for a destination may be removed from the forwarding table, if for no source node the route to the destination node comprises a link directed towards the network router.

In another configuration of the first or second aspect the topology of the network and the link weights of the network may be known. The step of removing the forwarding table entries which are not used may comprise for all destination entries in the forwarding table, comparing for all source nodes in the network (a) the length of the shortest path from a node directly linked to the network router to a destination with (b) the sum of the length of the direct link and the length of the shortest path from the network router to the destination. The entry for a destination may be removed from the forwarding table, if the lengths of the paths are not equal.

In a further configuration of the first and second aspect at least some of the destinations may be inter-domain addresses. The method may further comprise the step of removing the inter-domain destinations from the forwarding table, if the edge node through which the inter-domain destination is reachable has been removed from the forwarding table.

In yet another configuration of the first and second aspect an entry from the node forwarding table is not removed if it is part of a static route.

According to a third aspect of the present invention a network router comprises a plurality of ingress interfaces, and an interface forwarding table assigned to each ingress interface. At least one of the interface forwarding tables comprises only forwarding table entries that are used.

According to a fourth aspect of the present invention a network router comprises a node forwarding table assigned to the router itself. The forwarding table comprises only forwarding table entries that are used.

According to a first configuration of the fourth aspect, the network router may further comprise a plurality of ingress interfaces, and an interface forwarding table assigned to each ingress interface. At least one of the interface forwarding tables is a copy of the reduced node forwarding table.

According to a configuration of the third or fourth aspect the forwarding table of at least one of its interfaces may comprise an entry for a destination, if for at least one source node the route to the destination node goes through the corresponding interface.

According to another configuration of the third or fourth aspect the forwarding table of the node or at least one of its interfaces may comprise an entry for a destination, if for at least one source node the route to the destination node comprises a link directed towards the network router.

According to a fifth aspect of the present invention a network router comprises a node forwarding table assigned to the router itself, a plurality of ingress interfaces, an interface forwarding table assigned to each ingress interface, and means for removing the forwarding table entries that are not used from at least one of the interface forwarding tables.

According to a sixth aspect of the present invention a network router comprises a node forwarding table assigned to the router itself and means for removing the forwarding table entries which are not used.

In a first configuration of the sixth aspect the network router may further comprise a plurality of ingress interfaces, an interface forwarding table assigned to each ingress interface, and means for copying the reduced node forwarding table to at least one of the interface forwarding tables.

In a configuration of the fifth or sixth aspect the network router may further comprise means for reducing a forwarding table in accordance with the method of the first or second aspect.

According to a seventh aspect of the present invention a computer program product comprises data processing device program code means adapted to perform the method of the first or second aspect when said program is run on a data processing device.

According to an eighth aspect of the present invention a computer-readable medium comprises computer-executable instructions to reduce any forwarding table of a network router in accordance with the first or second aspect.

The smaller size of the forwarding tables obtained by the present invention may significantly improve the performance of a router. The lookup of the next-hop may take less time. Fewer recursive lookups may allow the processing capacity requirement of the routing engine to be reduced. The smaller size of the forwarding tables may also reduce traffic by the control messages. Moreover, routing convergence time may be reduced. Furthermore, the present invention may be applied to each node individually without influencing the behaviour of the rest of the network.

DETAILED DESCRIPTION

A router has a forwarding table assigned to each ingress interface, referred to as interface forwarding table. Another table is assigned to the router itself, referred to as node forwarding table. The interface forwarding tables may be identical copies of the node forwarding table. This would serve the purpose of decreasing the forwarding delay. Packets arriving at the router at an ingress interface are routed according to the corresponding interface forwarding table, while packets originating from the router itself (e.g., ping commands from the command line interface, or higher level protocol messages) are routed based on the node forwarding table.

Many of the forwarding entries are actually never used during the routing. In a certain routing configuration, packets headed to a certain destination may never go through some nodes, or—more frequently—may never go through some links. These destinations are superfluous in the forwarding tables since they are never used.

However, as with normal destinations, most of the "not-via" destinations are also not used since the detour paths corresponding to a failure do not pass through a lot of links and nodes. These nodes do not need to have these not-via addresses in their forwarding tables.

A lot of the recursive lookups are not required because their results are never used during forwarding, but they place a processing burden on the routing engine. It makes no sense to stretch re-convergence time by the download of a lot of unneeded entries into the forwarding engine. Knowing that a lot of the entries are never used, this is a waste of bandwidth and processing capacity.

In a particular routing configuration, routes headed to a certain destination usually never go through some nodes, or—more frequently—may never go through some links. In these cases such destinations may safely be removed from the forwarding table of the corresponding node or interface, respectively.

Figure 1:
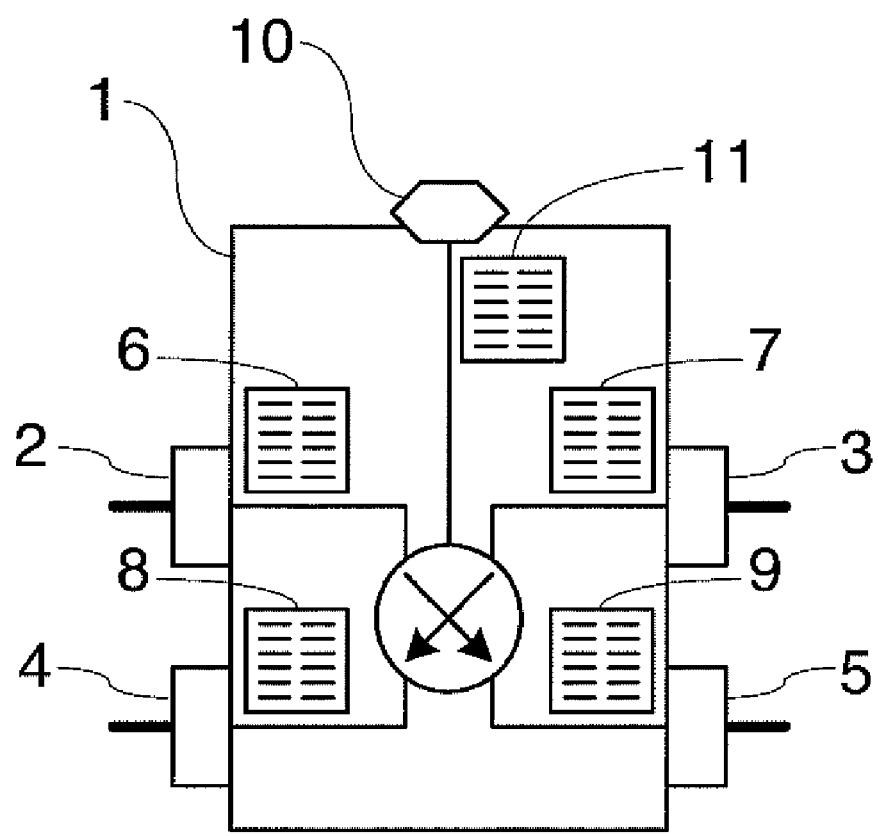
FIG. 1 illustrates schematically the logical view of the forwarding tables in a router.

With reference to FIG. 1, a logical view of the forwarding tables in a router is shown in a schematic manner. A router 1 has a number of line cards for the ingress interfaces 2 and 3 as well as egress interfaces 4 and 5. For reasons of simplicity, however, only two interfaces of each kind are depicted in FIG. 1. Moreover, the router has a forwarding table assigned to each ingress interface, referred to as interface forwarding tables 6, 7, 8, 9. The router also has another forwarding table assigned to the router itself, referred to as node forwarding table 11. The interface forwarding tables 6, 7, 8, 9 may be identical copies of the node forwarding table 11. This would serve the purpose of reducing the forwarding delay. Packets arriving at the router at one of the ingress interfaces 2 or 3 are routed according to the corresponding interface forwarding table 6 or 7, while the packets originating from the router 1 itself, e.g. ping commands from the command line interface (CLI) 10, or higher level messages, are routed based on the node forwarding table 11.

In a first scenario, the actual routing in the network is known, i.e. the routing tables of all nodes and interfaces are known. This is a realistic assumption if
- the routing tables are computed in a centralised way, or
- each node runs the same routing algorithm and the output of it is deterministic and predictable by the other nodes, i.e. deterministic tie-breaking rules are used if multiple equivalent paths are used.

An exemplary network that fulfils these conditions may consist of the same kind of routers.

In a second scenario, the routing is on shortest paths. While the nodes know the topology and the actual link weight, it cannot be predicted which shortest path was actually chosen by the intermediate routers. The most prominent example for this is OSPF or IS-IS, where the tie-breaking rules are vendor dependent, so that a router cannot always guess which alternative paths are used. In fact, in the case of Equal-Cost Multi-Path (ECMP) routing all of the shortest paths are in use.

In some cases, the administrator may also statically configure explicit forwarding table entries having precedence over the OSPF based routes. These will be referred to as explicit paths.

Figure 2:
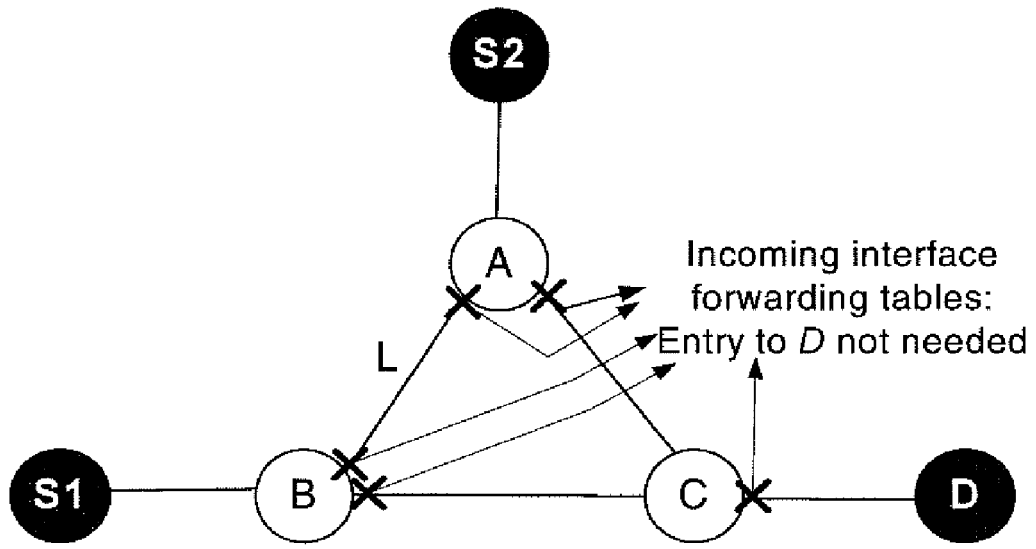
FIG. 2 is a schematic of a network illustrating per-interface forwarding table reduction according to the present invention.

FIG. 2 is a schematic of a network illustrating per-interface forwarding table reduction according to the present invention. S1 and S2 are source nodes, A and B are nodes in the network linked by link L, and D is a destination node. The forwarding tables at the incoming interfaces signed with a cross do not need to contain an entry to destination D, because arriving traffic will not be directed towards destination D. Utilising the fact that in an advanced router, the forwarding tables of each interface can be set individually, it is possible that one interface of node A must list destination D, while two other interface of node A do not need this destination.

According to the present invention, the unused destination addresses are removed from the ingress interface forwarding table of node B at link L, where L is the link between node A and node B. Further, link L is considered a directed link going from node A to node B, and carrying traffic only in this direction. In order to determine whether a destination D may be removed from this forwarding table, it needs to be checked if link L may be used by any traffic arriving at the ingress interface of link L at node B heading towards destination D. If link L is not used by any possible traffic, it may safely be removed from the forwarding table at node B.

Figure 3:
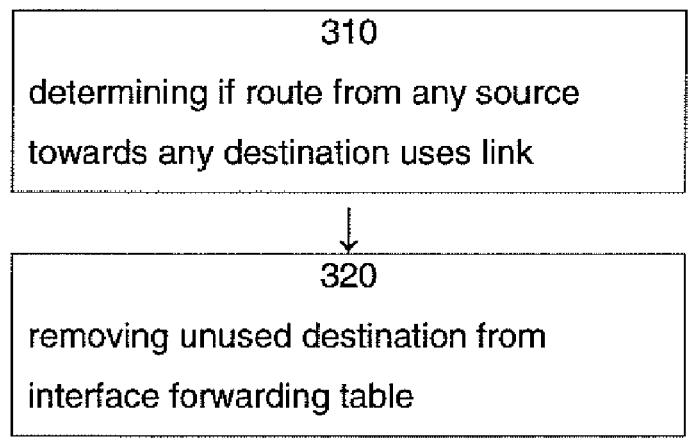
FIG. 3 illustrates a method of reducing an interface forwarding table according to the present invention.

In the first scenario described above the exact routes are known. As shown in FIG. 3 it is determined in step 310 whether the route from a certain source S to D contains the link L. This is repeated for each possible source node S within the autonomous system or routing area and the unused destinations are removed from the forwarding table in step 320. After reducing the table, the forwarding table of the ingress interface of L at node A comprises an entry for destination node D if and only if there exists a source node S for which the traffic from S to D may go through link L.

With respect to the second scenario, let w(L) denote the administrative weight (length) of the link L and let d(X,Y) be the length of the shortest path from node X to node Y, i.e.

$$d(X, Y) := \min\left\{\sum_{L \in P} w(L)\right\}$$

where P is a path from X to Y. If node A generates or forwards traffic towards destination D, then this traffic may use link L if and only if $$d(A,D)=w(L)-d(B,D).$$

However, if explicit paths are given, it also needs to be checked whether there is an explicit table entry in node A suppressing the default shortest path behaviour. This can be done in many ways:
1. If static routes are distributed with OSPF or IS-IS, the information is present.
2. Otherwise, it may be assumed that the node forwarding tables are always filled with all potential destination prefixes, since the user may wish to send traffic to any destination. If an interface receives a packet headed towards a destination that is not listed in the respective interface forwarding table, it may divert this packet to the node forwarding table to obtain a valid outgoing (egress) interface.
3. Alternatively, the FIB of node A must be queried, e.g. via SNMP. This, however, requires a new function in the routers and is a slower process that could cause longer transient times with packet losses during updates of the static routing tables.

Finally, in order to determine the necessary routing table entries, the set of interfaces which may forward traffic to D needs to be identified. Let this set be denoted by FD. The result can be found by dynamic programming:
- The edge nodes must be in set FD.
- If a node A is in FD, and A can forward the traffic to node B, then B (i.e. the ingress interface coming from A) must also be in FD.

Also note that the prefix or prefixes of the directly connected interfaces are never removed from the forwarding tables.

Assuming that the router itself does not generate packets to arbitrary destinations and that there are no explicit paths configured into the network that are not learnt by any of the means (1. to 3.) listed above, an alternative to the interface forwarding table reduction would be to remove the unnecessary destination addresses from the node forwarding table of any node. If one wishes to reduce the node forwarding table of a node N, the functionality of making an identical copy of the node forwarding table for the interface remains unchanged, thus reducing the required new functionality and processing.

Figure 4:
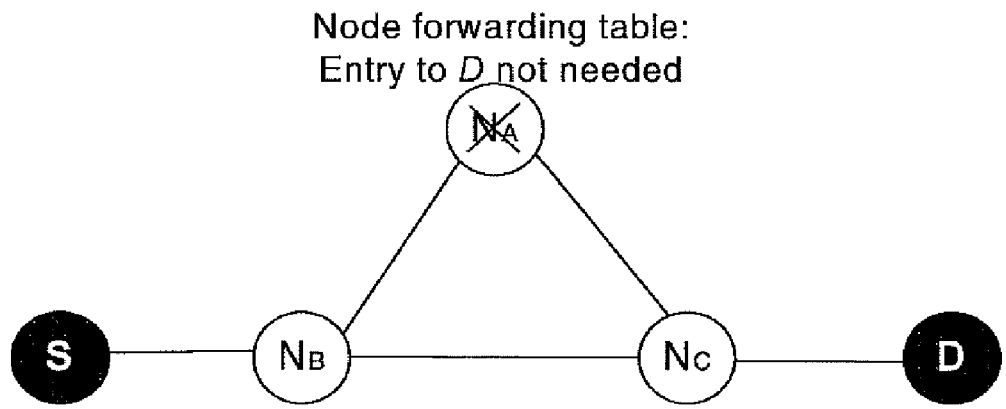
FIG. 4 is a schematic of a network illustrating a method of node forwarding table reduction according to the present invention.

FIG. 4 is a schematic of a network illustrating a node forwarding table reduction according to the present invention. S represents a source node, $N_A$, $N_B$ and $N_C$ are network nodes, and D is a destination node. This example shows that the upper node $N_A$ does not need to contain an entry towards destination D as normally traffic from source S will not pass through this node, i.e., the shortest path between source S and destination D does not pass the upper node $N_A$ through any interface.

Figure 5:
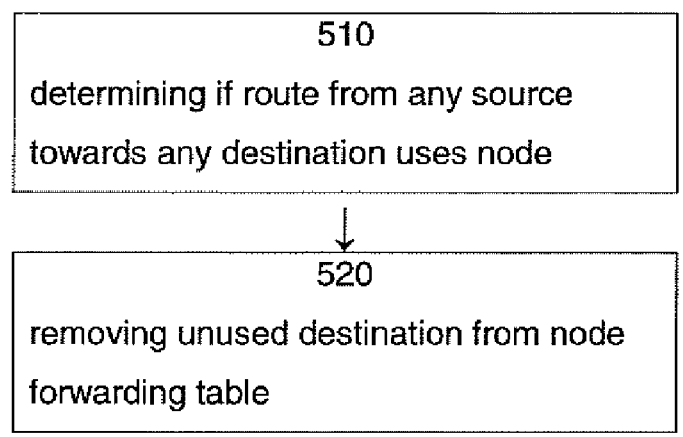
FIG. 5 illustrates a method of reducing a node forwarding table according to the present invention.

With reference to FIG. 5, in step 510 it is determined whether a node N may be used by the traffic from any source S toward D. If node N is not used, destination D may be removed from the node forwarding table in step 520.

In the first scenario described above the actual routing in the network, and thus the exact routes, are known. It is therefore trivial to check whether the route from S to D contains node N.

In the second scenario mentioned above routing is on shortest paths. Hence, the dynamic programming procedure described in the previous section may be used.

It is well known that the majority of the forwarding table entries come from external prefixes (i.e. inter-domain routes). These are generally propagated by BGP. However, BGP only determines the edge router to use in order to reach a given prefix. The intra-domain route is left for the IGP protocol; hence the actual egress (outgoing) interface towards an external prefix is learnt by recursive lookup.

However, if an interface or node B is not along the IGP route towards an edge node D from any other node S, then this edge node D is not listed as a destination in the corresponding interface forwarding table or node forwarding table at node B. This also means that the forwarding table of B does not need to contain any external prefixes which would use edge node D. Therefore, the number of external prefixes may also be greatly reduced, and the routing engine does not even need to perform a recursive lookup on these prefixes.

The smaller size of the forwarding tables obtained by the present invention may significantly improve the performance of a router: when a packet is to be forwarded, the lookup of the next-hop takes less time because the number of entries in the forwarding table is smaller.

Such a reduction is particularly important when the network nodes propagate several virtual addresses for failure protection or other purposes. According to the present invention, a lot of these virtual addresses do not need to be stored in each router and can be removed.

Furthermore, by needing less recursive lookups the processing capacity requirement of the routing engine may be reduced.

Using centralised router configuration, the smaller size of the forwarding tables also means that less traffic is generated by the control messages and reduces the management complexity.

According to the present invention, routing convergence time may be reduced with OSPF or IS-IS, since the major part of the re-routing time with fast IGPs is the time needed to download and install the forwarding table to the linecard.

The method according to the present invention may be applied to each node individually without influencing the behaviour of the rest of the network.

The invention claimed is:

1. A method of configuring a network router, wherein the network router comprises a plurality of ingress interfaces, and an interface forwarding table assigned to each ingress interface, the method comprising the steps of, for each ingress interface:
   determining if the ingress interface may be used as part of a route from any source node to any destination node in a network, wherein the interface forwarding tables of all network routers and all ingress interfaces in the network are known; and
   removing from the interface forwarding table any forwarding table entries for destination nodes towards which the ingress interface is not used as part of a route from any source node in the network, wherein the removing step comprises:
   for all destination entries in the interface forwarding table, checking for all source nodes in the network whether the route from the source node to the destination node comprises a link directed towards the network router; and
   removing the entry for a destination from the interface forwarding table, if for no source node the route to the destination node comprises a link directed towards the network router.

2. A method of configuring a network router, the network router comprising a node forwarding table, the method comprising the steps of:
   determining if the network router may be used as part of a route from any source node to any destination node in a network, wherein the node forwarding tables of all network routers and all ingress interfaces in the network are known; and
   removing from the node forwarding table any forwarding table entries for destination nodes towards which the network router is not used as part of a route from any source node in the network, wherein the removing step comprises:
   for all destination entries in the node forwarding table, checking for all source nodes in the network whether the route from the source node to the destination node comprises a link directed towards the network router; and
   removing the entry for a destination from the node forwarding table, if for no source node the route to the destination node comprises a link directed towards the network router.

3. The method of claim 2, wherein the network router further comprises a plurality of ingress interfaces and an interface forwarding table assigned to each ingress interface, the method further comprising the steps of, for each ingress interface;
   determining if the ingress interface may be used as part of a route from any source node to any destination node in the network; and
   removing from the interface forwarding tables any forwarding table entries for destination nodes towards which the ingress interface is not used as part of a route from any source node in the network.

4. A method of configuring a network router, wherein the network router comprises a plurality of ingress interfaces, and an interface forwarding table assigned to each ingress interface, the method comprising the steps of, for each ingress interface:
   determining if the ingress interface may be used as part of a route from any source node to any destination node in a network, wherein a topology of the network and lengths of links of the network are known, and;
   removing from the interface forwarding table any forwarding table entries for destination nodes towards which the ingress interface is not used as part of a route from any source node in the network, wherein the removing step comprises:
   for all destination entries in the interface forwarding table comparing for all source nodes in the network a length of a shortest path from a source node directly linked to the network router to a destination node with a sum of a length of a direct link and a length of a shortest path from the network router to the destination node; and
   removing the entry for the destination node from the interface forwarding table, if the compared lengths of the paths are not equal.

5. The method according to claim 1, at least some of the destination nodes have inter-domain addresses,
   the method further comprising the step of removing forwarding tables entries associated with the inter-domain addresses from the interface forwarding table if an edge node through which the corresponding destination node having the inter-domain address is reachable has been removed from the interface forwarding table.

6. The method according to claim 1, wherein an entry from the interface forwarding table is not removed if it is part of a static route.

7. A network router comprising:
a plurality of ingress interfaces, and
an interface forwarding table assigned to each ingress interface, and the network router configured to for each ingres interface;
determine if the ingress interface may be used as part of a route from any source node to any destination node in a network, wherein the interface forwarding tables of all network routers and all ingress interfaces in the network are known; and
remove from the interface forwarding table any forwarding table entries for destination nodes towards which the ingress interface is not used as part of a route from any source node in the network, wherein the remove operation comprises:
for all destination entries in the interface forwarding table, check for all source nodes in the network whether the route from the source node to the destination node comprises a link directed towards the network router; and
remove the entry for a destination from the interface forwarding table, if for no source node the route to the destination node comprises a link directed towards the network router.

8. A network router comprising:
a node forwarding table, and the network router configured to
determine if the network router may be used as part of a route from any source node to any destination node in a network, wherein the node forwarding tables of all network routers and all ingress interfaces in the network are known; and
remove from the node forwarding table any forwarding table entries for destination nodes towards which the network router is not used as part of a route from any source node in the network, wherein the remove operation comprises:
for all destination entries in the node forwarding table, check for all source nodes in the network whether the route from the source node to the destination node comprises a link directed towards the network router; and
remove the entry for a destination from the node forwarding table, if for no source node the route to the destination node comprises a link directed towards the network router.

9. The network router of claim 8, wherein the network router further comprises a plurality of ingress interfaces and an interface forwarding table assigned to each ingress interface, and the network router configured to for each ingress interface;
determine if the ingress interface may be used as part of a route from any source node to any destination node in the network: and
removing from the interface forwarding tables any forwarding table entries for destination nodes towards which the ingress interface is not used as part of a route from any source node in the network.

10. The network router according claim 7, wherein the interface forwarding table of at least one of the ingress interfaces comprises an entry for a destination node, if for at least one source node the route to that destination node goes through the corresponding ingress interface.

11. The network router according to claim 8, wherein the node forwarding table comprises an entry for a destination node if for at least one source node the route to that destination node comprises a link directed towards the network router.

12. A network router comprising,
a node forwarding table assigned to the router;
a plurality of ingress interfaces;
an interface forwarding table assigned to each ingress interface and the network router configured to for each ingress interface comprises;
means for determining if the ingress interface may be used as part of a route from any source node to any destination node in a network, wherein the interface forwarding tables of all network routers and all ingress interfaces in the network are known; and
means for removing from the interface forwarding table the forwarding table entries for destination nodes towards which the ingress interface is not used as part of a route from any source node in the network, wherein the removing means further comprises:
for all destination entries in the interface forwarding table, means for checking for all source nodes in the network whether the route from the source node to the destination node comprises a link directed towards the network router; and
means for removing the entry for a destination from the interface forwarding table, if for no source node the route to the destination node comprises a link directed towards the network router.

13. A network router comprising:
a node forwarding table;
means for determining if the network router may be used as part of a route from any source node to any destination node in a network, wherein the node forwarding tables of all network routers and all ingress interfaces in the network are known;
means for removing from the node forwarding table any forwarding table entries for destination nodes towards which the network node is not used as part of a route from any source node in the network, wherein the removing means comprises:
means for reducing the forwarding table by checking for all source nodes in the network whether the route from the source node to the destination node comprises a link directed towards the network router; and
means for removing the entry for a destination from the node forwarding table, if for no source node the route to the destination node comprises a link directed towards the network router.

14. The network router of claim 13, wherein the network router further comprises
a plurality of ingress interfaces;
an interface forwarding table assigned to each ingress interface; and
means for copying the reduced node forwarding table to at least one of the interface forwarding tables.

15. A network router comprising
a node forwarding table;
means for removing from the node forwarding table any forwarding table entries for destination nodes towards which the network node is not used as part of a route from any source node in a network, wherein a topology of the network and lengths of links of the network are known; and
the means of removing the node forwarding table any forwarding table entries for destination nodes towards which the network router is not used as part of a route from any source node in the network, comprises
means for comparing for all source nodes in the network a length of a shortest path from a source node directly linked to the network router to a destination with a sum of a length of a direct link and a length of a shortest path from the network router to the destination node; and means for removing the entry for the destination node from the node forwarding table, if the compared lengths of the paths are not equal.

16. The network router of claim 13 at least some of the destination nodes have inter-domain addresses, further comprising means for removing forwarding tables entries associated with the inter-domain addresses from the interface forwarding table if an edge node through which the corresponding destination node having the inter-domain address is reachable has been removed from the interface forwarding table.

17. The network router of claim 13, wherein an entry from the node forwarding table is not removed if it is part of a static route.

18. A method of configuring a network router, the network router comprising a node forwarding table, the method comprising the steps of:

determining if the network router may be used as part of a route from any source node to any destination node in a network, wherein a topology of the network and lengths of links of the network are known; and removing from the node forwarding table any forwarding table entries for destination nodes towards which the network router is not used as part of a route from any source node in the network, wherein the removing step comprises:

for all destination entries in the node forwarding table comparing for all source nodes in the network a length of a shortest path from a source node directly linked to the network router to a destination node with a sum of a length of a direct link and a length of a shortest path from the network router to the destination node; and removing the entry for the destination node from the node forwarding table, if the compared lengths of the paths are not equal.

19. The method of claim 18, wherein the network router further comprises a plurality of ingress interfaces and an interface forwarding table assigned to each ingress interface, the method further comprising the steps of, for each ingress interface;

determining if the ingress interface may be used as part of a route from any source node to any destination node in the network; and removing from the interface forwarding tables any forwarding table entries for destination nodes towards which the ingress interface is not used as part of a route from any source node in the network.

20. A network router comprising:

a plurality of ingress interfaces, and an interface forwarding table assigned to each ingress interface, and the network router configured to for each ingress interface;

determine if the ingress interface may be used as part of a route from any source node to any destination node in a network, wherein a topology of the network and lengths of links of the network are known, and;

remove from the interface forwarding table any forwarding table entries for destination nodes towards which the ingress interface is not used as part of a route from any source node in the network, wherein the remove operation comprises:

for all destination entries in the interface forwarding table compare for all source nodes in the network a length of a shortest path from a source node directly linked to the network router to a destination node with a sum of a length of a direct link and a length of a shortest path from the network router to the destination node; and removing the entry for the destination node from the interface forwarding table, if the compared lengths of the paths are not equal.

21. A network router comprising:

a node forwarding table, and the network router configured to determine if the network router may be used as part of a route from any source node to any destination node in a network, wherein a topology of the network and lengths of links of the network are known; and remove from the node forwarding table any forwarding table entries for destination nodes towards which the network router is not used as part of a route from any source node in the network, wherein the removing step comprises:

for all destination entries in the node forwarding table compare for all source nodes in the network a length of a shortest path from a source node directly linked to the network router to a destination node with a sum of a length of a direct link and a length of a shortest path from the network router to the destination node; and remove the entry for the destination node from the interface forwarding table, if the compared lengths of the paths are not equal.

22. The network router of claim 21, further comprises a plurality of ingress interfaces and an interface forwarding table assigned to each ingress interface, and the network router configured to for each ingress interface;

determine if the ingress interface may be used as part of a route from any source node to any destination node in the network; and removing from the interface forwarding tables any forwarding table entries for destination nodes towards which the ingress interface is not used as part of a route from any source node in the network.

23. A network router comprising, a node forwarding table assigned to the router;

a plurality of ingress interfaces;

an interface forwarding table assigned to each ingress interface, and the network router configured to for each ingress interface comprises;

means for determining if the ingress interface may be used as part of a route from any source node to any destination node in a network, wherein a topology of the network and lengths of links of the network are known, and;

means for removing from the interface forwarding table any forwarding table entries for destination nodes towards which the ingress interface is not used as part of a route from any source node in the network, wherein the removing means comprises:

for all destination entries in the interface forwarding table, means for comparing for all source nodes in the network a length of a shortest path from a source node directly linked to the network router to a destination node with a sum of a length of a direct link and a length of a shortest path from the network router to the destination node; and means for removing the entry for the destination node from the interface forwarding,table, if the compared lengths of the paths are not equal.

* * * * *

UNITED STATES PATENT AND TRADEMARK OFFICE
CERTIFICATE OF CORRECTION

| | | Page 1 of 1 |
|---|---|---|
| PATENT NO. | : 8,218,453 B2 | |
| APPLICATION NO. | : 12/525717 | |
| DATED | : July 10, 2012 | |
| INVENTOR(S) | : Jüttner et al. | |

It is certified that error appears in the above-identified patent and that said Letters Patent is hereby corrected as shown below:

In Column 8, Line 5, in Claim 2, delete "router," and insert -- router, wherein --, therefor.

In Column 9, Line 10, in Claim 7, delete "ingres" and insert -- ingress --, therefor.

In Column 9, Line 61, in Claim 10, delete "according" and insert -- according to --, therefor.

In Column 10, Line 1, in Claim 11, delete "node if" and insert -- node, if --, therefor.

In Column 10, Line 4, in Claim 12, delete "comprising," and insert -- comprising: --, therefor.

In Column 10, Line 9, in Claim 12, delete "comprises;" and insert -- comprises: --, therefor.

In Column 10, Line 48, in Claim 14, delete "comprises" and insert -- comprises: --, therefor.

In Column 10, Line 54, in Claim 15, delete "comprising" and insert -- comprising: --, therefor.

In Column 10, Line 64, in Claim 15, delete "comprises" and insert -- comprises: --, therefor.

In Column 11, Line 6, in Claim 16, delete "claim 13" and insert -- claim 13, wherein --, therefor.

In Column 11, Lines 7-8, in Claim 16, delete "comprising" and insert -- comprising: --, therefor.

In Column 11, Line 17, in Claim 18, delete "router," and insert -- router, wherein --, therefor.

In Column 12, Line 39, in Claim 23, delete "comprising," and insert -- comprising: --, therefor.

In Column 12, Line 44, in Claim 23, delete "comprises;" and insert -- comprises: --, therefor.

In Column 12, Line 60, in Claim 23, delete "forwarding,table," and insert -- forwarding table, --, therefor.

Signed and Sealed this
Twentieth Day of November, 2012

David J. Kappos
*Director of the United States Patent and Trademark Office*